Dec. 17, 1935.  V. J. CHAPMAN  2,024,965

WELDING APPARATUS

Filed Oct. 1, 1931  2 Sheets-Sheet 1

Inventor:
Verni J. Chapman,
by Charles V. Muller
His Attorney.

Dec. 17, 1935.  V. J. CHAPMAN  2,024,965
WELDING APPARATUS
Filed Oct. 1, 1931  2 Sheets-Sheet 2
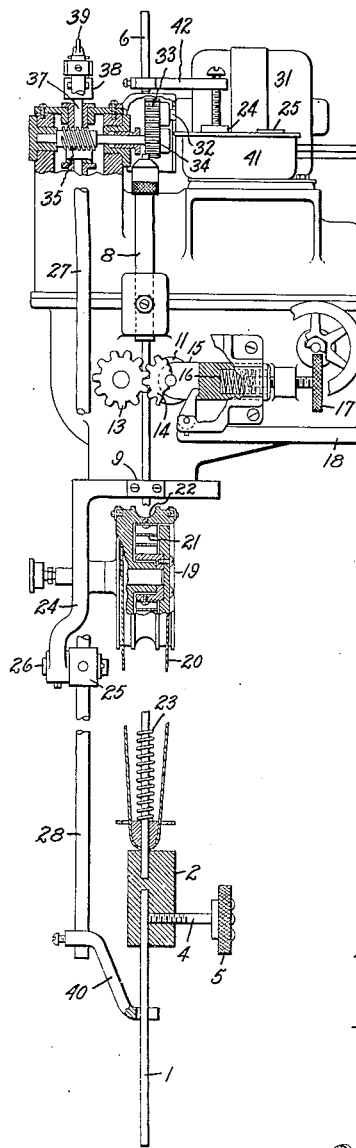
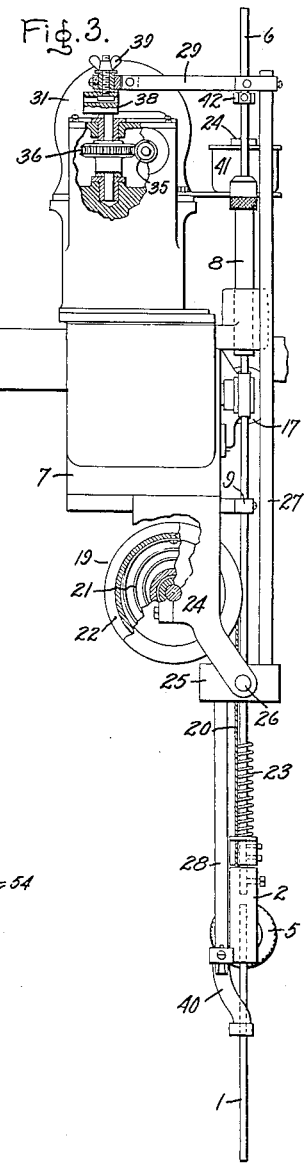
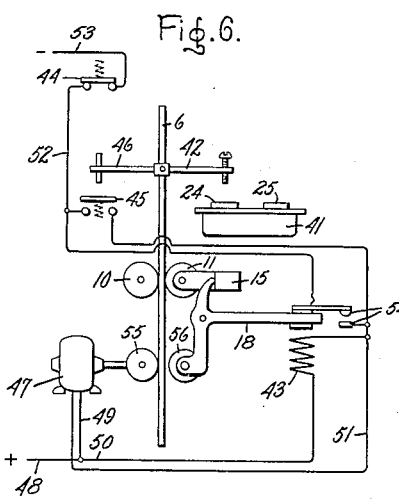
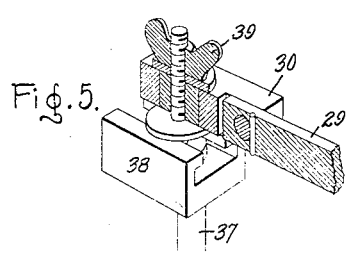
Inventor:
Verni J. Chapman,
by Charles A. Tullar
His Attorney.

Patented Dec. 17, 1935

2,024,965

UNITED STATES PATENT OFFICE 2,024,965

WELDING APPARATUS

Verni J. Chapman, Schenectady, N. Y., assignor to General Electric Company, a corporation of New York Application October 1, 1931, Serial No. 566,294

16 Claims. (Cl. 219—8)

My invention relates to automatic arc welding apparatus, and particularly to apparatus suitable for feeding short length or stick electrodes.

Electrode material is furnished in short lengths for hand welding and in coils of indefinite length for automatic welding. The electrode material may be uncoated or coated with a fluxing material for assisting the welding operation and for protecting and purifying the weld metal. When the flux coatings are comparatively thick it is difficult to conduct the welding current into the electrode in automatic machines unless particular coatings or special current feeding arrangements are employed. Electrodes with heavy flux coatings are consequently generally used for hand welding operations and sold in short lengths with one end bared for insertion in an electrode holder.

It is an object of my invention to provide welding apparatus suitable for automatically feeding short length electrodes such as are employed in hand welding operations.

It is a further object of my invention to provide apparatus which may be associated with the usual standard form of automatic arc welding head for rendering it suitable for feeding short lengths of electrode material.

It is a further object of my invention to provide a feeding means of such construction that an automatic oscillating movement may be imparted to the electrode.

My invention will be better understood from the following description taken in connection with the accompanying drawings.

Figure 1:
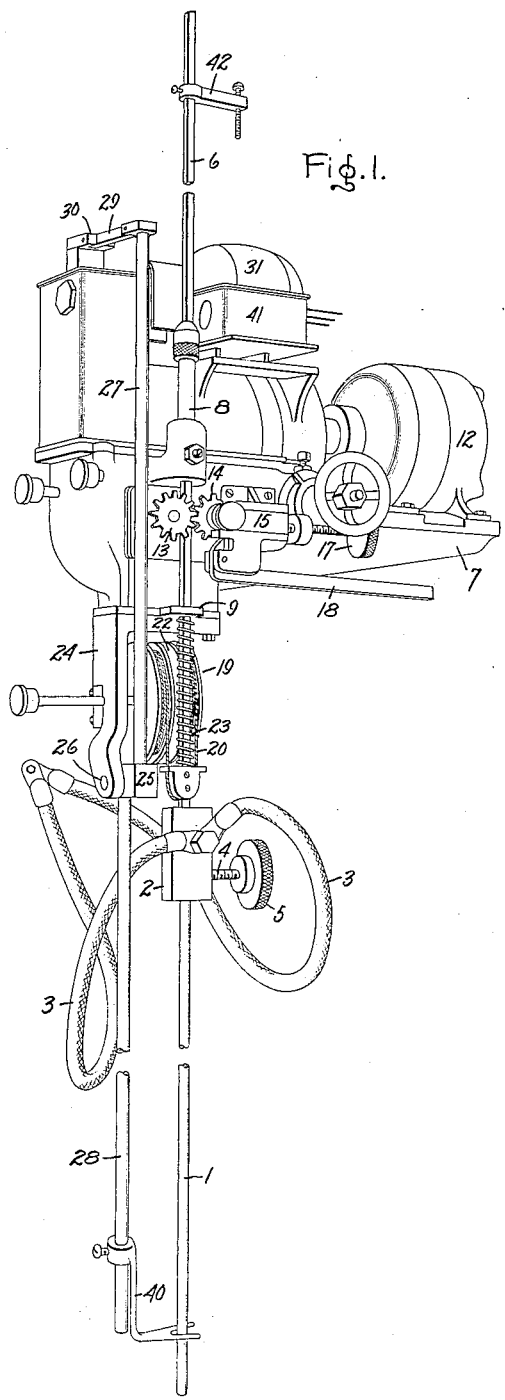
Figure 4:
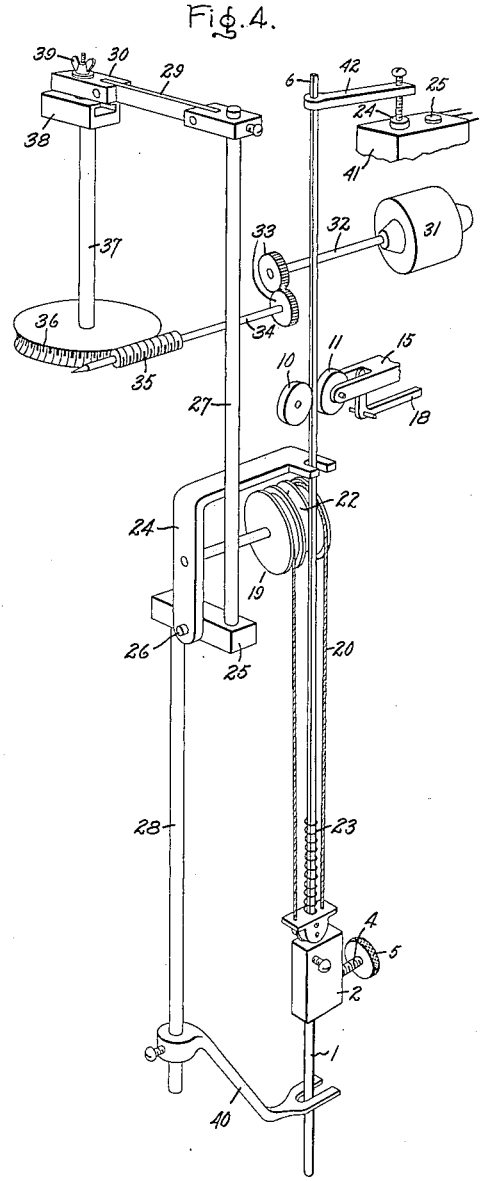

In these drawings Fig. 1 shows a perspective view; Fig. 2 a side view; and Fig. 3 an end view of an automatic arc welding apparatus in accordance with my invention; Fig. 4 is a diagrammatic view showing the relative arrangement of the parts of the apparatus shown in Figs. 1, 2 and 3; Fig. 5 is a detailed view of the adjustable crank of the oscillating mechanism incorporated in the welding apparatus illustrated; and Fig. 6 is a diagrammatic illustration of a modification of my invention.

In the apparatus shown in the drawings the welding electrode 1 is supported in a holder 2 to which welding current is supplied through conductors 3. The electrode is held in place by means of a set screw 4 provided with a handwheel 5. The electrode holder is attached to the lower end of a feed rod 6 which is held in place relatively to the welding head 7 by guides 8 and 9. These guides also hold the feed rod 6 between feed rolls 10 and 11 of the welding head 7.

In the particular welding head illustrated, feed roll 10 is positively driven by feed motor 12 at a rate corresponding to the consumption of the electrode in the welding arc by a control arrangement which may be such as illustrated in U. S. Letters Patent No. 1,701,372, F. M. Jefts, for Arc welding, granted February 5, 1929, and assigned to the same assignee as the present application. The feed roll 11 is positively driven by feed roll 10 through intermeshing gears 13 and 14.

Feed roll 11 is supported in a block 15 and held in engagement with the feed rod 6 by means of a spring 16 acting against the block 15. The tension of the spring may be controlled by a set screw 17 supported in the frame of the welding head 7 and acting against one end of the spring 16. Feed roll 11 may be disengaged from the feed rod 6 through the operation of a bell-crank lever 18 which when depressed forces the block 15 to the right against the action of the spring 16 and removes feed roll 11 from driving engagement with feed rod 6.

The electrode holder and feed rod are biased to the retracted position shown in Figs. 1, 2 and 3 by a suitable means such as the spring drum 19 and cable 20. When the lever 18 is depressed the feeding engagement between the feed rolls 10 and 11 and the feed rod 6 is released and the electrode holder 2 is raised to the elevated position shown in Fig. 1 by means of the drum and cable arrangement illustrated. The drum 19 encloses a spring 21 which tends to rotate the drum 19 in a counterclockwise direction (as viewed in Figs. 3 and 4) to wind cable 20 upon it and thereby retract the electrode holder. It will be noted that the drum 19 is provided with a cut out portion or groove 22 so that it may be placed closely adjacent the feed rod 6 in order to have the cable 20 substantially in line with it. A buffer spring 23 is located about the lower portion of the feed rod 6 and acts against the abutment formed by guide 9 to cushion the impact of the electrode holder 2 against this guide when the lever 18 is depressed to permit the retraction of the electrode holder.

Drum 19 is supported in a bracket 24 which is attached to the welding head 7. As pointed out above the feeding means 6 for carrying the electrode is guided at 9 in this bracket which constitutes a support means mounted in fixed relation to the welding head. This bracket also acts as a support for a block 25 to which are attached, on opposite sides of the pivot point 26, rods 27 and 28. Rod 27 is attached by a connecting rod 29 to an adjustable crank 30. This crank is rotated by a motor 31 connected thereto by a shaft 32, gears 33, shaft 34, gears 35 and 36, and a shaft 37. The construction of the adjustable crank is shown in detail in Fig. 5. The shaft 37 terminates in a keywayed block 38 to which one end of the connecting rod 29 is held by a clamp screw 39. By loosening the screw 39 the point of attachment along the length of the keyway may be varied so as to adjust the throw of the crank to various desired values. This crank acts through the connecting rod 29 and rods 27 and 28 connected by block 25 to oscillate an arm 40 attached to the lower end of the rod 28. The arm 40 is located beyond the path of movement of holder 2 and is provided with means for engaging the electrode 1 at a point near its arcing terminal. The mechanism just described operates to oscillate the electrode at an amplitude and rate depending upon the adjustment of the crank 30 and the speed of the motor 31. The feed rod 6 is made of flexible material in order to permit this oscillatory movement.

Control switches are mounted on the welding head 7 at 41. These control switches may be the start and stop buttons "24" and "25" of U. S. Letters Patent No. 1,701,372, Jefts, February 5, 1929, above referred to. An operating member 42 for one of these control switches is adjustably supported on the upper end of the feed rod 6. In the particular arrangement employed the adjustment is such that member 42 engages the stop button after a predetermined electrode feeding movement to interrupt the welding operation.

The method of operation is as follows: An electrode 1 is inserted in the electrode holder 2 and clamped in place by the set screw 4 which is operated through the hand-wheel 5. The start button is then operated to initiate the welding operation and the welding electrode 1 is fed toward the work to strike and maintain the welding arc during the welding operation by the welding head 7 acting through the feed rolls 10 and 11 on the feed rod 6. During the welding operation the electrode may be oscillated by means of the oscillating mechanism above described. When a predetermined electrode feeding movement has taken place the stop 42 on rod 6 will engage the stop button and interrupt the welding operation. The operator may then by depressing the lever 18 permit the electrode holder 2 to return to its retracted position by means of the upward bias imparted to it through the drum and cable above described. The operator then inserts a new electrode in the electrode holder 2 and depresses the start button to initiate another welding operation.

The electrode support may be automatically released from its driving engagement with the feed rolls of the welding head and retrieved by a retracting means after the electrode has been fed a predetermined distance and has been fused a predetermined amount. To this end the operation of lever 18 may be made automatic by an arrangement such as illustrated in Fig. 6. In Fig. 6 the lever 18 is operated by an electromagnet 43, the energization of which is controlled by limit switches 44 and 45. These switches are operated by an arm 46 which is adjustably attached to the feed rod 6. Limit switch 44 is normally biased to its closed position, and limit switch 45 is normally biased to an open position. Upon closure of switch 45 an operating circuit for electromagnet 43 and motor 47 is completed as follows: From terminal 48 through conductors 49 and 50 to motor 47 and coil 43, and thence through conductor 51, limit switch 45, conductor 52, and limit switch 44 to the other terminal of the source of supply 53. Upon the operation of lever 18 auxiliary contacts 54 complete the circuit just traced irrespective of the position of the limit switch 45 and feed rolls 10 and 11 are withdrawn from driving engagement with feed rod 6 and feed rolls 55 and 56 are placed in driving engagement therewith. Feed motor 47 operates through feed rolls 55 and 56 to return feed rod 6 to its initial position whereby the engagement of lever 46 with limit switch 44 its energization is interrupted. At the same time the energization of coil 43 is also interrupted and the driving engagement of feed rolls 10 and 11 on the feed rod 6 reestablished for again feeding an electrode supported in the holder 2 attached to the lower end of this rod toward the work in accordance with its consumption in the welding arc.

Preferably the speed of return of the feed rod 6 to its upper position is much greater than the speed at which it is fed downward during welding. The particular arrangement illustrated in Fig. 6 is of advantage in that the feeding movement is not in opposition to an upward bias imparted to the electrode holder 2 through a drum and reel or equivalent arrangement such as employed in Figs. 1, 2, 3 and 4.

It will be noted that the apparatus for feeding the short length electrodes above described is in the nature of an attachment which may be added to any form of welding head for feeding short length electrodes. The apparatus is not restricted in its application to the feeding of heavily coated electrodes but may be used for feeding any form of short length or stick electrodes.

While I have shown particular embodiments of my invention such modifications and variations are contemplated as fall within the scope of my invention which is set forth in the appended claims.

What I claim as new and desire to secure by Letters Patent of the United States is,—

1. Welding apparatus for feeding short length electrodes comprising an electrode holder, a feed rod attached to said electrode holder, means engaging said feed rod for feeding an electrode supported in said electrode holder toward the work to be welded, means including a motor for operating said feeding means, means for interrupting the operation of said motor, and means adjustably supported on said feed rod for operating said last-mentioned means after a predetermined electrode feeding movement.

2. Welding apparatus for feeding short length electrodes comprising an electrode holder, a feed rod attached to said electrode holder, means engaging said feed rod for feeding an electrode supported in said electrode holder toward the work to be welded at a rate corresponding to its consumption in the welding arc, means including a switch for controlling the welding operation, and means supported on said feed rod for operating said control switch after a predetermined electrode feeding movement.

3. Welding apparatus for feeding short length electrodes comprising an electrode holder, a flexible feed rod attached to said electrode holder, means including a plurality of feed rolls engaging said feed rod for feeding said electrode holder and an electrode supported therein toward the work to be welded, means located beyond the path of movement of said holder and engaging said electrode near its arcing terminal, and means for oscillating said electrode engaging means.

4. Welding apparatus for feeding short length electrodes comprising an electrode holder, a feed rod attached to said electrode holder, means engaging said feed rod for feeding said electrode holder toward the work to be welded, means for releasing the engagement of said feeding means with said feed rod, and means for returning said electrode holder to its initial position upon the operation of said last mentioned means.

5. Welding apparatus for feeding short length electrodes comprising an electrode holder, a feed rod attached to said electrode holder, means for biasing said electrode holder away from the work, means engaging said feed rod for feeding said electrode holder against said bias toward the work, and means for releasing the engagement of said feeding means with said feed rod.

6. Welding apparatus for feeding short length electrodes comprising an electrode holder, a feed rod attached to said electrode holder, means for biasing said electrode holder to a retracted position away from the work, means engaging said feed rod for feeding said electrode holder against said bias toward the work, means for releasing the engagement of said feeding means with said feed rod, a buffer spring about said feed rod, and an abutment for said buffer spring against which it acts when said releasing means is operated for releasing said electrode holder to its retracted position.

7. Welding apparatus for feeding short length electrodes comprising a flexible feed rod, means including a plurality of feed rolls engaging said feed rod, means for guiding said feed rod between said feed rolls, an electrode holder attached to one end of said feed rod, means including a switch for controlling the welding operation, means supported on the other end of said feed rod for operating said switch after a predetermined feeding movement, means engaging near its arcing terminal an electrode supported in said holder, and means for oscillating said electrode engaging means.

8. Welding apparatus for feeding short length electrodes comprising an electrode holder, a feed rod attached to said electrode holder, means engaging said feed rod for feeding an electrode supported in said electrode holder toward the work to be welded, means engaging said feed rod for feeding said electrode holder in a reverse direction, and means supported on said feed rod for controlling the operation of said last two mentioned means.

9. Welding apparatus for feeding short length electrodes comprising an electrode holder, a feed rod attached to said electrode holder, means engaging said feed rod for feeding an electrode supported in said electrode holder toward the work, means for interrupting said feeding operation and for returning said feed rod and electrode holder to its initial position, and means supported on said feed rod for operating said last two mentioned means after a predetermined electrode feeding movement.

10. Welding apparatus for feeding short length electrodes comprising an electrode holder, a feed rod attached to said electrode holder, means engaging said feed rod for feeding an electrode supported in said electrode holder toward the work, means engaging said feed rod for feeding said electrode holder in a reverse direction, means for selectively operating said feeding means, and means supported on said feed rod for controlling the operation of said feeding means.

11. Welding apparatus for feeding short length electrodes comprising an electrode holder, a feed rod attached to said electrode holder, means engaging said feed rod for feeding an electrode supported in said electrode holder toward and away from the work to be welded, electrical means for operating said feeding means, switching means for controlling said electrical means, and means supported on said feed rod for controlling the operation of said switching means.

12. Welding apparatus for feeding short length electrodes comprising an electrode holder, a feed rod attached to said electrode holder, means engaging said feed rod for feeding it toward the work to be welded, means engaging said feed rod for feeding it in a reverse direction, means for operating said feeding means, means for biasing one of said feeding means into engagement with the rod and the other of said feeding means out of engagement with said rod, electromagnetic means for overcoming said bias and reversing the normal feeding arrangement to retract said feed rod, means for controlling the welding operation, means supported on said feed rod for operating said controlling means, limit switches spaced from one another a predetermined distance, means for connecting said limit switches to said electromagnetic means and to the means for operating said reverse feeding means, and means supported on said feed rod for operating said limit switches to control the operation of said electromagnetic means and said reverse feeding means.

13. In arc welding apparatus, in combination, support means for a welding electrode, feeding means for the support means to feed the welding electrode carried thereby as it is fused, and means for automatically retrieving the support means after the welding electrode has been fused a predetermined amount.

14. In arc welding apparatus, in combination, support means for a welding electrode, actuating means having driving connection with the support means for feeding the electrode as it is fused, and retracting means disposed to automatically function after the electrode has been fused a predetermined amount for retrieving the support means.

15. Welding electrode feeding apparatus comprising, in combination, a welding head, a motor carried by the welding head, a feed roller mounted on the welding head and having driving connection with the motor, a welding electrode support slidably mounted on the welding head and in driving engagement with the feed roller, and means for automatically releasing the electrode support from said driving engagement and retrieving it after the electrode has been fed a predetermined distance.

16. An attachment for use with a welding head for feeding short lengths of welding electrodes to perform a welding operation, comprising, in combination, support means mounted in fixed relation to the welding head, feeding means for carrying a welding electrode, the feeding means being guided in the support means and having driving connection with the welding head, and retracting means connected to the feeding means for automatically retrieving the feeding means after having been fed a predetermined distance.

VERNI J. CHAPMAN.